(12) United States Patent
Romero

(10) Patent No.: US 10,723,297 B2
(45) Date of Patent: Jul. 28, 2020

(54) VEHICLE ENERGY ABSORBING DEVICE

(71) Applicant: Ford Global Technologies, LLC, Dearborn, MI (US)

(72) Inventor: Jorge Romero, Naucalpan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 109 days.

(21) Appl. No.: 15/953,993

(22) Filed: Apr. 16, 2018

(65) Prior Publication Data

US 2019/0315298 A1   Oct. 17, 2019

(51) Int. Cl.
| B60R 19/18 | (2006.01) |
| B60R 19/02 | (2006.01) |
| B60R 19/03 | (2006.01) |

(52) U.S. Cl.
CPC ............ *B60R 19/18* (2013.01); *B60R 19/023* (2013.01); *B60R 19/03* (2013.01); *B60R 2019/186* (2013.01); *B60R 2019/1893* (2013.01)

(58) Field of Classification Search
CPC . B60R 19/18; B60R 2019/1893; B60R 19/22; B60R 19/34; B60R 19/44; B60R 2019/1846; B60R 2019/186
USPC ....... 293/120, 133, 102, 117, 122, 155, 146, 293/136, 126; 264/257, 149, 241, 242, 264/516, 46.6, 40.1, 319; 296/187.02, 296/191, 193.01, 187.04, 187.12
See application file for complete search history.

(56) References Cited

U.S. PATENT DOCUMENTS

| 6,648,384 | B2 | 11/2003 | Nees et al. | |
| 7,938,463 | B2 | 5/2011 | Lee | |
| 9,233,657 | B1* | 1/2016 | Phadatare | B60R 19/18 |
| 2007/0278803 | A1* | 12/2007 | Jaarda | B60R 19/18 293/120 |
| 2012/0032458 | A1* | 2/2012 | Brooks | B29C 51/10 293/120 |
| 2014/0312636 | A1* | 10/2014 | Corwin | B60R 21/34 293/133 |
| 2017/0051806 | A1 | 2/2017 | Kang et al. | |
| 2017/0088074 | A1* | 3/2017 | Borghi | B60R 19/18 |
| 2017/0355332 | A1 | 12/2017 | Pingston et al. | |

FOREIGN PATENT DOCUMENTS

| CN | 104372758 A | 2/2015 |
| EP | 0467193 A1 | 1/1992 |
| EP | 1193135 A1 | 4/2002 |

* cited by examiner

*Primary Examiner* — D Glenn Dayoan
*Assistant Examiner* — Sunsurraye Westbrook
(74) *Attorney, Agent, or Firm* — David Coppiellie; Bejin Bieneman PLC

(57) ABSTRACT

A bumper assembly includes a bumper elongated along a first axis. The bumper assembly includes a first energy absorbing device extending from the bumper, the first energy absorbing device having a second axis perpendicular to the first axis, the first energy absorbing device being elastically deformable along the second axis. The bumper assembly includes a second energy absorbing device within the first energy absorbing device and being shorter than the first energy absorbing device.

19 Claims, 6 Drawing Sheets

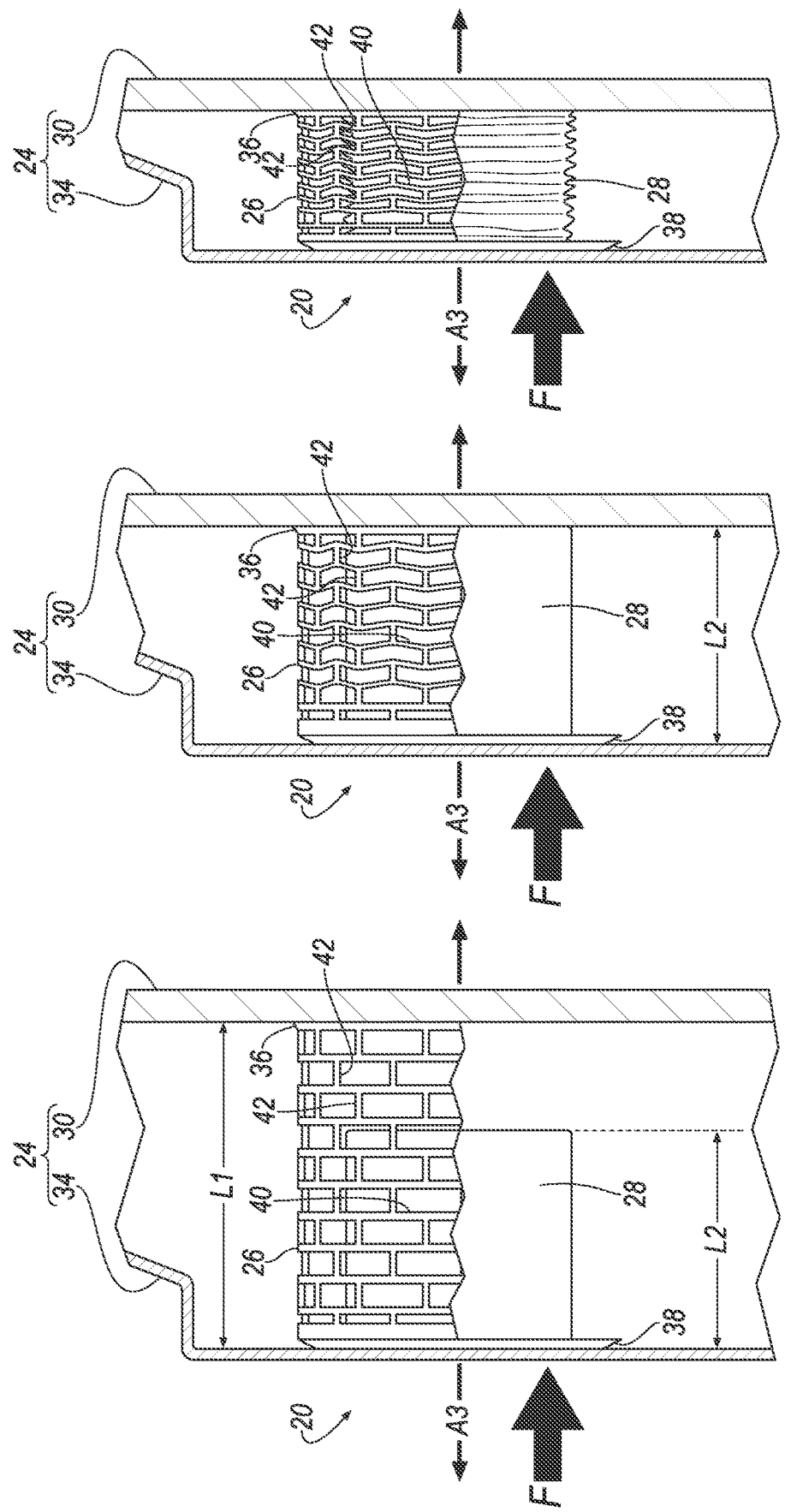

VEHICLE ENERGY ABSORBING DEVICE

BACKGROUND

Vehicle bumpers may have a stiffness determined by the material and structure of the bumper. However, the desired stiffness of the bumper may be different depending on vehicle speed. For example, at a low vehicle speed, a higher stiffness may be desired to prevent damage to the bumper, while at a high vehicle speed, a lower stiffness may be desired to absorb energy during a pedestrian or vehicle impact.

Several vehicle research organizations release test protocols and standards for vehicles directed to specific outcomes. For example, the Research Council for Automobile Repairs (RCAR) releases impact test protocols and standards for vehicles. One example RCAR impact test protocol is directed toward low speed damageability (LSD), i.e., damage to vehicle component at 15 kilometers per hour (kph). In another example, the National Highway Traffic Safety Administration (NHTSA) releases the Federal Motor Vehicle Safety Standards (FMVSS) Part 581, which describes impact test protocols for LSD of vehicle bumper systems. Other regulations for LSD include 49 CFR Part 581 (USA), ECE 42 (Europe), GS 41 (GCC), Article 93 (Korea), and CMVSS 215 (Canada, 5 mph). However, as described above, the stiffness of the bumper system for LSD may differ from the stiffness desired for pedestrian protection. For example, the European New Car Assessment Programme (EURO NCAP) protocols for upper leg impact at 40 kph and lower leg impact at 40 kph may be benefited by a lower stiffness for the bumper in comparison to the stiffness desired for FMVSS protocols for LSD. In other words, requirements for LSD and pedestrian protection may create competing design principles. There remains an opportunity to design a vehicle bumper that accounts for low speed damageability and pedestrian impact.

BRIEF DESCRIPTION OF THE DRAWINGS

FIG. 8 is a cross section of the bumper assembly with a force applied and the first energy absorbing device in an extended position, and a portion of the first energy absorbing device broken away to reveal the second energy absorbing device.

FIG. 9 is a cross section of the bumper assembly with the force applied and the first energy absorbing device in a compressed position, and a portion of the first energy absorbing device broken away to reveal the second energy absorbing device.

FIG. 10 is a cross section of the bumper assembly with the force applied and the first energy absorbing device compressed beyond the compressed position, and a portion of the first energy absorbing device broken away to reveal the second energy absorbing device.

DETAILED DESCRIPTION

Figure 1:
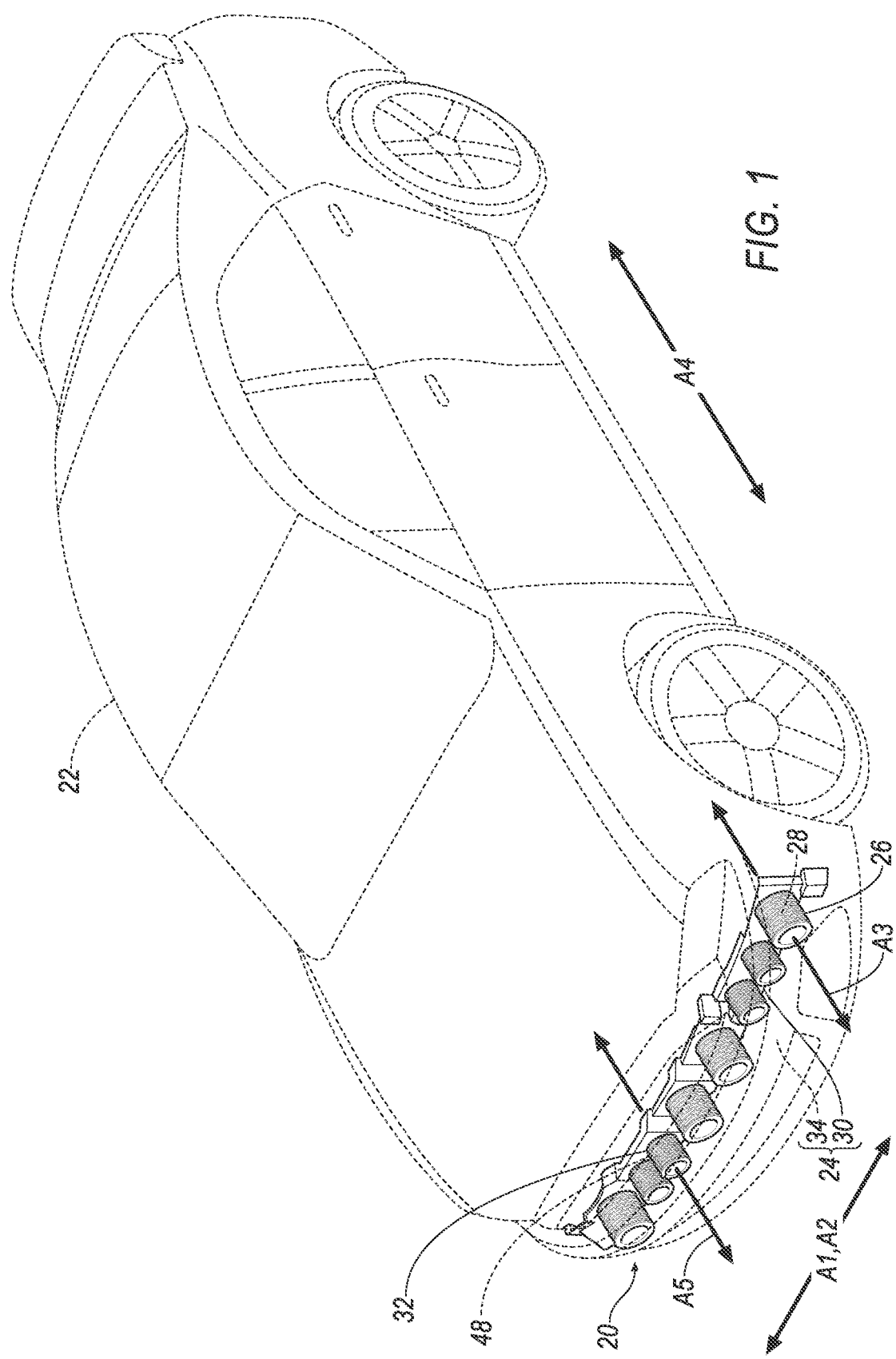
FIG. 1 is a perspective view of a vehicle having a bumper assembly.
Figure 2:
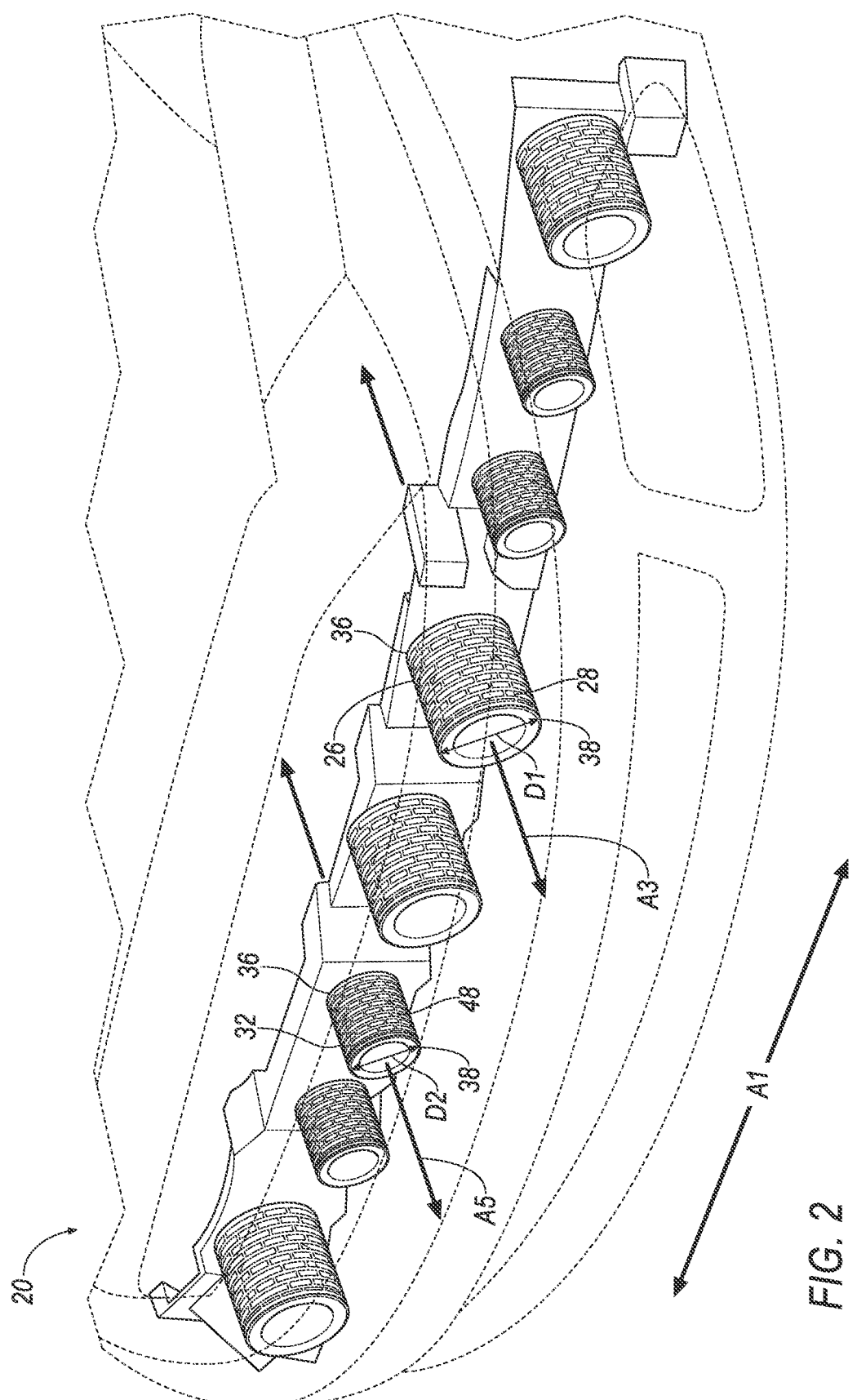
FIG. 2 is a perspective view of a portion of the vehicle having the bumper assembly.
Figure 3:
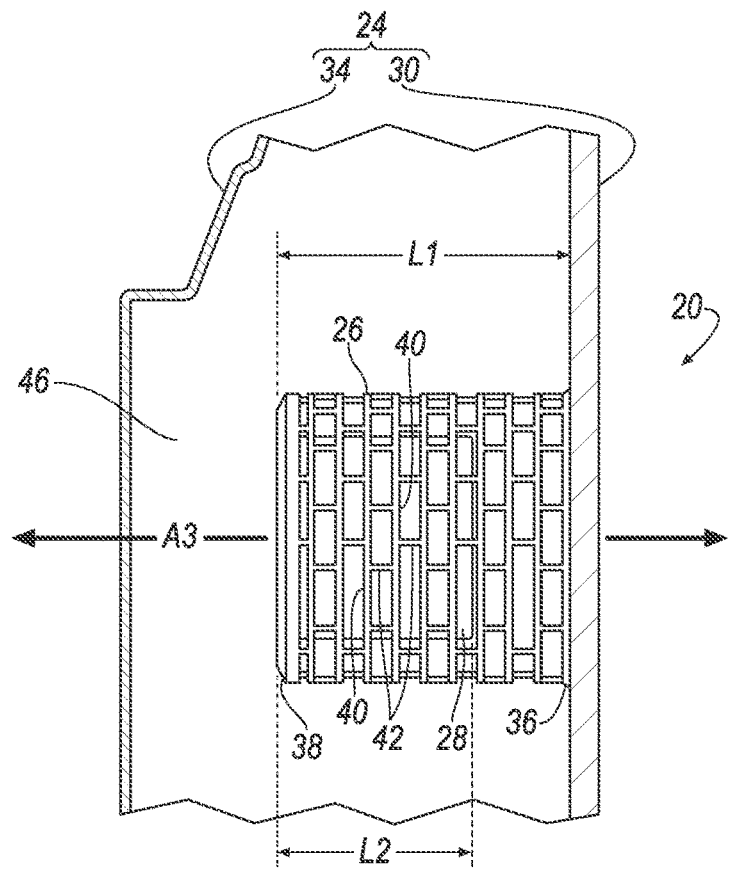
FIG. 3 is a cross section of the bumper assembly.

A bumper assembly includes a bumper elongated along a first axis. The bumper assembly includes a first energy absorbing device extending from the bumper, the first energy absorbing device having a second axis perpendicular to the first axis, the first energy absorbing device being elastically deformable along the second axis. The bumper assembly includes a second energy absorbing device within the first energy absorbing device and being shorter than the first energy absorbing device.

The first energy absorbing device and the second energy absorbing device may be coaxial on the second axis.

The first energy absorbing device may define a cavity and the second energy absorbing device may be in the cavity.

The first energy absorbing device may be cylindrical.

The first energy absorbing device may include a plurality of rings spaced from each other along the second axis and a plurality of connecting members extending between the rings.

The first energy absorbing device may be elastically deformable from an extended position where the second energy absorbing device is spaced from the bumper to a compressed position where the second energy absorbing device abuts the bumper.

The first energy absorbing device may extend away from the bumper to a distal end, the second energy absorbing device may be fixed to the distal end.

The second energy absorbing device may have a higher crush resistance than the first energy absorbing device.

The bumper assembly may include a third energy absorbing device extending from the bumper, the third energy absorbing device having a third axis perpendicular to the first axis, the third energy absorbing device being elastically deformable along the third axis, and the bumper assembly may include a fourth energy absorbing device within the third energy absorbing device and being shorter than the third energy absorbing device.

The first energy absorbing device may have an outer diameter that is greater than an outer diameter of the third energy absorbing device.

The first energy absorbing device may have a higher crush resistance than the third energy absorbing device.

The first energy absorbing device may be spaced from the third energy absorbing device along the first axis.

The bumper may include a beam.

The bumper may include a body panel.

A vehicle includes a bumper elongated along a cross-vehicle axis. The vehicle includes a first energy absorbing device extending from the bumper along a vehicle-longitudinal axis, the first energy absorbing device being elastically deformable along the vehicle-longitudinal axis. The vehicle includes a second energy absorbing device within the first energy absorbing device and being shorter than the first energy absorbing device.

The first energy absorbing device may extend vehicle-forward from the bumper.

The first energy absorbing device may extend vehicle-rearward from the bumper.

The bumper may include a beam and a body panel, and the first energy absorbing device may be between the beam and the body panel.

The first energy absorbing device may extend from the beam and may be spaced from the body panel.

The first energy absorbing device may extend from the body panel and may be spaced from the beam.

With reference to the Figures, wherein like numerals indicate like parts throughout the several views, a bumper assembly 20 for a vehicle 22 includes a bumper 24 elongated along a first axis A1, e.g., a cross-vehicle axis A2. The bumper assembly 20 includes a first energy absorbing device 26 extending from the bumper 24, the first energy absorbing device 26 having a second axis A3 perpendicular to the first axis A1. For example, the second axis A3 may be parallel to a vehicle-longitudinal axis A4. The first energy absorbing device 26 is elastically deformable along the second axis A3. The bumper assembly 20 includes a second energy absorbing device 28 within the first energy absorbing device 26 and being shorter than the first energy absorbing device 26.

The adjectives "first," "second," etc., are used throughout this document as identifiers and are not intended to signify importance or order.

The first energy absorbing device 26 and the second energy absorbing device 28 enable the bumper assembly 20 to absorb energy in stages. For example, during a vehicle impact the first energy absorbing device 26, and not the second energy absorbing device 28, may be elastically deformed to absorb energy and then return to an un-deformed position after such impact. Deformation of the first energy absorbing device 26, and not the second energy absorbing device 28, provides a lower stiffness, e.g., to enable the bumper assembly 20 to provide pedestrian protection. As another example, during a vehicle impact the first energy absorbing device 26 and the second energy absorbing device 28 may deform, e.g., to absorb more energy that if only the first energy absorbing device 26 was deformed. Deformation of the first energy absorbing device 26 and the second energy absorbing device 28 provides a greater stiffness, e.g., to enable the bumper assembly 20 to have a desired low speed damageability.

The vehicle 22 may be any passenger or commercial automobile such as a car, a truck, a sport utility vehicle, a crossover vehicle, a van, a minivan, a taxi, a bus, etc.

The vehicle 22 defines the vehicle-longitudinal axis A4, i.e., extending between a front and a rear of the vehicle 22. The vehicle 22 defines the cross-vehicle axis A2, i.e., extending between a left side and a right side of the vehicle 22. The cross-vehicle axis A2 and the vehicle-longitudinal axis A4 are perpendicular to each other. The front, rear, left side, and right side may be relative to an orientation of an operator of the vehicle 22. The front, rear, left side, and right side may be relative to an orientation of controls for operating the vehicle 22, e.g., an instrument panel, a steering wheel, etc. The front, rear, left side, and right side may be relative to a forward driving direction when wheels of the vehicle 22 are all parallel with each other.

The vehicle 22 may be of a unibody construction. In the unibody construction, a body, e.g., rockers, roof, pillars, etc., serve as a vehicle 22 frame. As another example, the vehicle 22 may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

As mentioned above, the bumper assembly 20 includes the bumper 24. The bumper 24 absorbs energy, e.g., during a vehicle impact with another vehicle, a pedestrian, etc. The bumper 24 is elongated along the first axis A1, e.g., the cross-vehicle axis A2 when assembled with the vehicle 22. To put it another way, when the bumper assembly 20 is assembled on the vehicle 22, the bumper 24 may extend from the left side to the right side of the vehicle 22, e.g., at the front of the vehicle 22.

The bumper 24 may include a beam 30. The beam 30 provides an interior structure, i.e., not visible from outside the vehicle 22, to the bumper 24 that absorbs energy during a vehicle impact. The beam 30 is elongated along the first axis A1, e.g., the beam 30 may extend from the right side to the left side along the cross-vehicle axis A2 when the bumper assembly 20 is installed on the vehicle 22. The beam 30 may support other components of the bumper assembly 20, such as the first energy absorbing device 26, a third energy absorbing device 32, etc. The beam 30 may be a component of the frame and/or unibody construction of the vehicle 22. The beam 30 may be metal, plastic, or any suitable material.

The bumper 24 may include a body panel 34. The body panel 34 provides an exterior structure, i.e., visible from outside the vehicle 22, to the bumper 24 that absorbs energy during a vehicle impact. The body panel 34 may have a class-A surface, i.e., a surface specifically manufactured to have a high quality, finished aesthetic appearance free of blemishes. The body panel 34 is elongated along the first axis A1, e.g., the body panel 34 may extend from the right side to the left side along the cross-vehicle axis A2 when the bumper assembly 20 is installed on the vehicle 22. The body panel 34 may support other components of the bumper assembly 20, such as the first energy absorbing device 26, the third energy absorbing device 32, etc. The body panel 34 may be supported by the beam 30, or any other suitable vehicle 22 structure. The body panel 34 may be a component of the body and/or unibody construction of the vehicle 22. The body panel 34 may be metal, plastic, or any suitable material.

The first energy absorbing device 26 absorbs energy, e.g., during a vehicle impact. The first energy absorbing device 26 has the second axis A3, e.g., extending between a proximal end 36 and a distal end 38 of the first energy absorbing device 26. The second axis A3 may be parallel to the vehicle-longitudinal axis A4, e.g., when the bumper assembly 20 is installed on the vehicle 22. The second axis A3 is perpendicular to the first axis A1, e.g., perpendicular to the cross-vehicle axis A2 when the bumper assembly 20 is installed on the vehicle 22.

The first energy absorbing device 26 may extend from the bumper 24, e.g., from the beam 30 or the body panel 34 (discussed below). The first energy absorbing device 26 may extend along the second axis A3, e.g., the vehicle-longitudinal axis A4. For example, the first energy absorbing device 26 may be between the beam 30 and the body panel 34 of the bumper 24 and be elongated along the second axis A3. The first energy absorbing device 26 may extend away from the proximal end 36 at the bumper 24, e.g., at the beam 30 or the body panel 34, to the distal end 38.

The first energy absorbing device 26 may be cylindrical. For example, the first energy absorbing device 26 may be a coil spring (not shown). As another example, the first energy absorbing device 26 may include a plurality of rings 40 and a plurality of connecting members 42. The rings 40 may be spaced from each other along the second axis A3, e.g., along the vehicle-longitudinal axis A4. The connecting members 42 may extend between the rings 40, e.g., connecting adjacent rings 40 to each other. The connecting members 42 may be elongated along the second axis A3. The connecting members 42 may be rotationally offset from each other relative to the second axis A3. To put it another way, connecting members 42 extending from one side of one of the rings 40 may be spaced from connecting members 42 extending from an opposite side of such ring 40 along such ring 40. The first energy absorbing device 26 may be plastic, steel, or any other suitable material.

The first energy absorbing device 26 may define a cavity 44. For example, the rings 40 may encircle the cavity 44, e.g., providing a cylindrical shape that extends from the bumper 24, e.g., from the beam 30 or the body panel 34, to the distal end 38 of the first energy absorbing device 26.

With reference to the embodiment shown in FIGS. 1-3 and 8-10, the first energy absorbing device 26 may extend from the beam 30. The first energy absorbing device 26 may extend vehicle-forward from the bumper 24, e.g., from the beam 30. For example, the proximal end 36 of the first energy absorbing device 26 may be fixed to the beam 30, e.g., via fastener, friction welding, adhesive, etc., with the first energy absorbing device 26 extending toward the body panel 34. The first energy absorbing device 26 may be spaced from the body panel 34. To put it another way, the distal end 38 of the first energy absorbing device 26 and the body panel 34 of the bumper 24 may define a gap 46 therebetween. The gap 46 permits an amount of energy to be absorbed by the body panel 34 during a vehicle impact as the body panel 34 deforms to close the gap 46 until the body panel 34 abuts the first energy absorbing device 26. The first energy absorbing device 26 and the beam 30 may be monolithic, i.e., a continuous one-piece construction.

Figure 4:
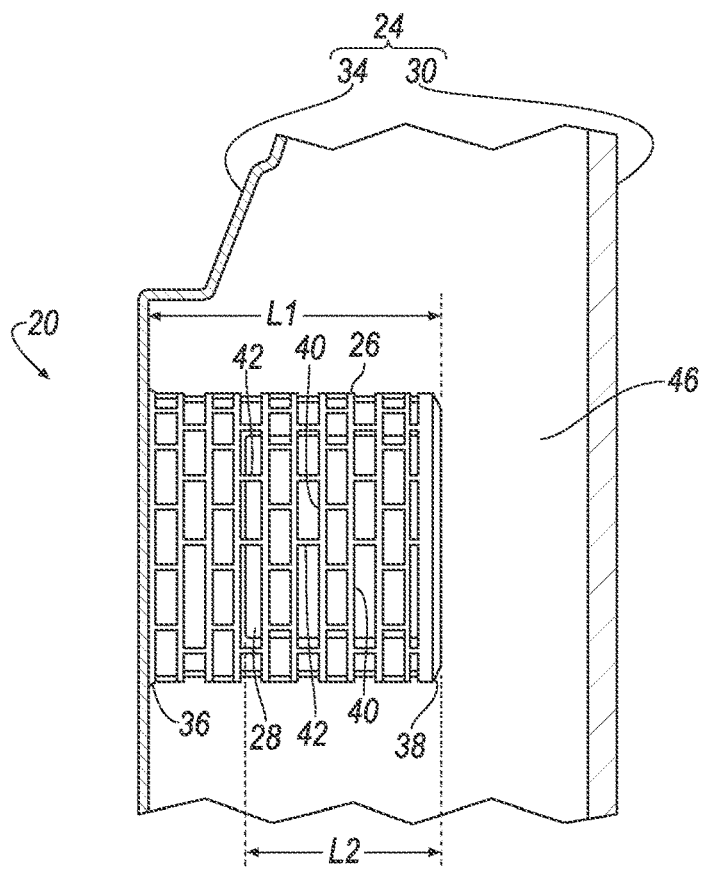
FIG. 4 is a cross section of another embodiment of the bumper assembly.
Figure 5:
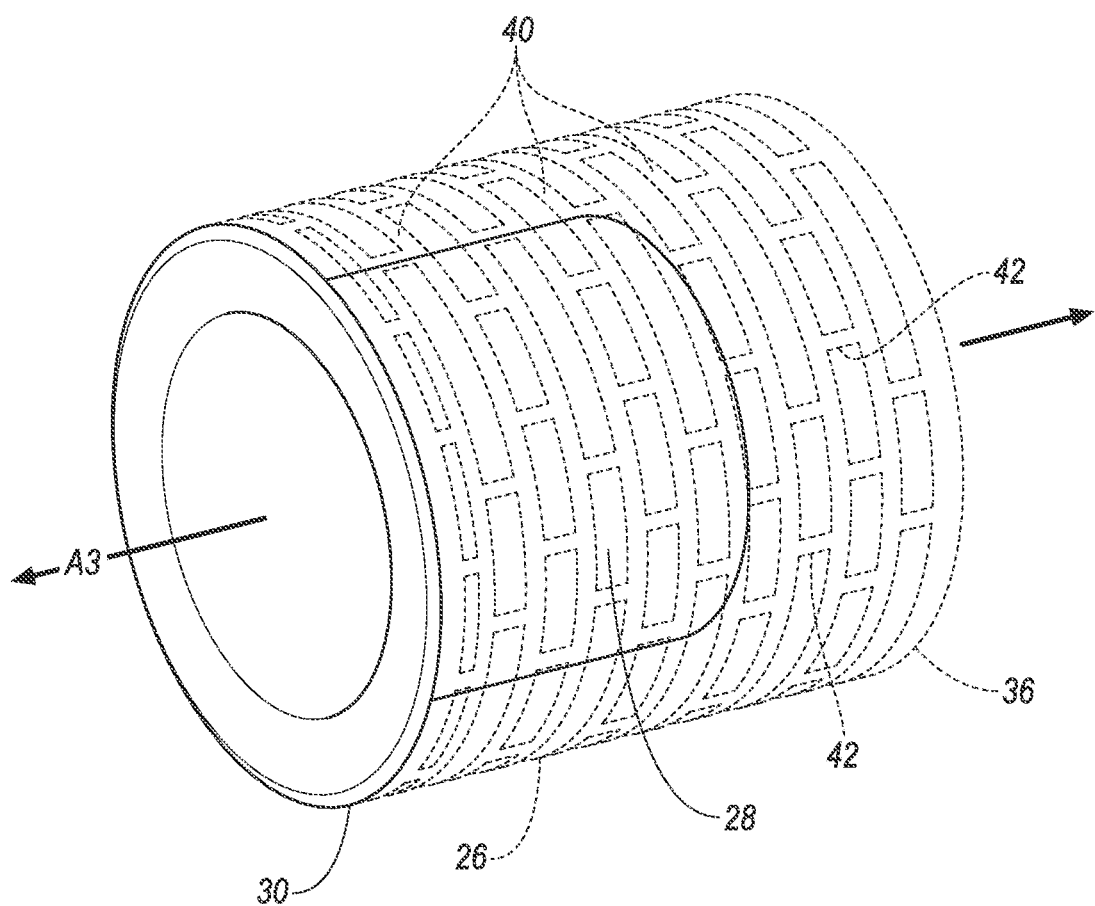
FIG. 5 is a perspective view of a first energy absorbing device and a second energy absorbing device of the bumper assembly.

With reference to the embodiment shown in FIG. 4, the first energy absorbing device 26 may extend from the body panel 34. The first energy absorbing device 26 may extend vehicle-rearward from the bumper 24, e.g., from the body panel 34. For example, the proximal end 36 of the first energy absorbing device 26 may be fixed to the body panel 34, e.g., via fastener, friction welding, adhesive, etc., with the first energy absorbing device 26 extending toward the beam 30. The first energy absorbing device 26 may be spaced from the beam 30. To put it another way, the distal end 38 of the first energy absorbing device 26 and the beam 30 of the bumper 24 may define a gap 46 therebetween. The gap 46 permits an amount of energy to be absorbed by the body panel 34 during a vehicle impact as the body panel 34 deforms to close the gap 46 until the beam 30 abuts the first energy absorbing device 26. The first energy absorbing device 26 and the body panel 34 may be monolithic, i.e., a continuous one-piece construction.

Returning to FIGS. 1-10, the first energy absorbing device 26 is elastically deformable along the second axis A3, e.g., along the vehicle-longitudinal axis A4. For example, the first energy absorbing device 26 may elastically deform from an extended position, shown in FIGS. 1-3 and 8, to a compressed position, shown in FIG. 9, and to a position beyond the compressed position, shown in FIG. 10. The first energy absorbing device 26 may move from the extended position to the compressed position and beyond upon application of force F to the bumper assembly 20, e.g., during a vehicle impact. Moving from the extended position to the compressed position and beyond permits an amount of energy to be absorbed by the first energy absorbing device 26 during a vehicle impact.

For example, as shown in FIGS. 8-10, force F applied to the first energy absorbing device 26 along the second axis A3, such as when the first energy absorbing device 26 is compressed between the beam 30 and the body panel 34 during a vehicle impact, is transmitted though the connecting members 42 and the rings 40. The offset arrangement of the connecting rings 40 with each other creates bending stresses in the rings 40. The rings 40 elastically bend to a zig-zag shape in the compressed position.

With reference to FIGS. 1-10, the second energy absorbing device 28 absorbs energy, e.g., during a vehicle impact. For example, the second energy absorbing device 28 may deform, crush, or otherwise decrease in length to absorb energy when compressed between the beam 30 and the body panel 34 during a vehicle impact. The second energy absorbing device 28 may be metal, plastic, or any other suitable material.

Figure 6:
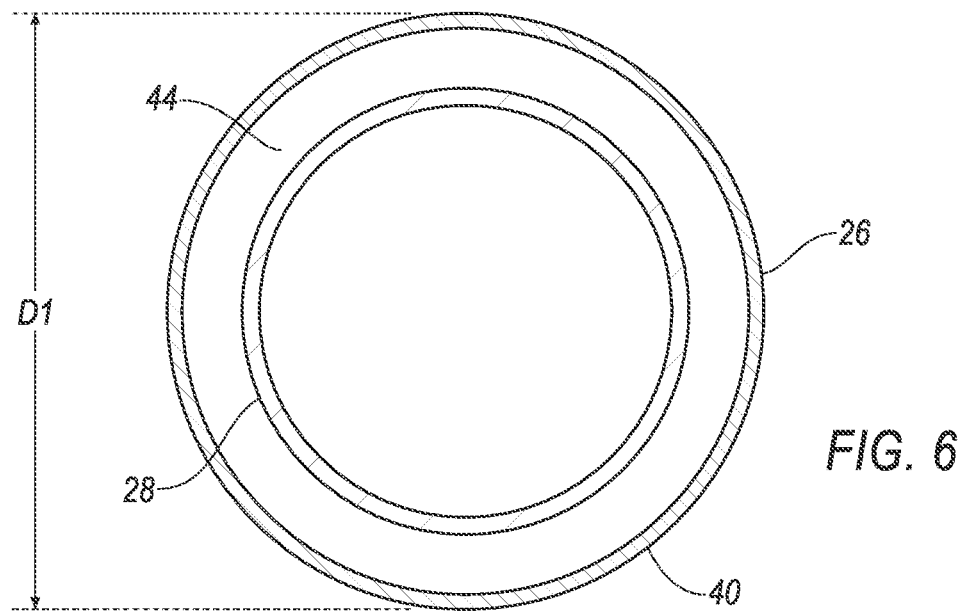
FIG. 6 is a cross section of the first energy absorbing device and the second energy absorbing device taken perpendicular to an axis of the first energy absorbing device.
Figure 7:
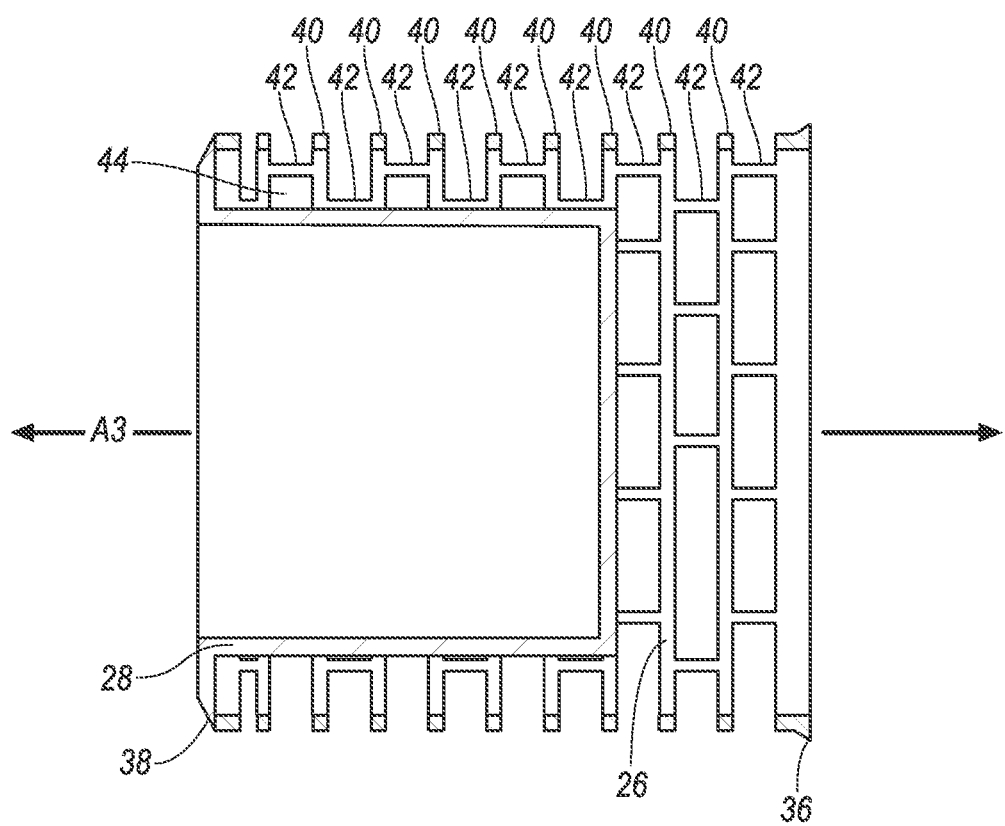
FIG. 7 is a cross section of the first energy absorbing device and the second energy absorbing device taken along the axis of the first energy absorbing device.

The second energy absorbing device 28 may be cylindrical and extend along the second axis A3. The second energy absorbing device 28 is within the first energy absorbing device 26. For example, the second energy absorbing device 28 may be in the cavity 44. To put it another way, the second energy absorbing device 28 may be encircled by one or more of the rings 40. The first energy absorbing device 26 and the second energy absorbing device 28 may be coaxial on the second axis A3. For example, a center of a circular cross section of the cylindrical shape of the second energy absorbing device 28 may be centered within one or more of the rings 40, as shown in FIG. 6. The second energy absorbing device 28 may be hollow, as shown in the Figures. The second energy absorbing device 28 may be solid, have an internal lattice structure, etc.

The second energy absorbing device 28 is shorter than the first energy absorbing device 26. For example, a length L1 between the beam 30 and the distal end 38 of the first energy absorbing device 26 or between the body panel 34 and the distal end 38 may be greater than a length L2 between opposing distal ends of the second energy absorbing device 28 along the second axis A3.

The second energy absorbing device 28 may be fixed to the distal end 38 of the first energy absorbing device 26, e.g., via fastener, friction welding, adhesive, etc. The first energy absorbing device 26 and the second energy absorbing device 28 may be monolithic, i.e., a continuous one-piece construction.

The second energy absorbing device 28 may be spaced from the bumper 24 when the first energy absorbing device 26 is in the extended position. For example, with reference to the embodiment shown in Figure FIGS. 1-3 and 8-10, the second energy absorbing device 28 may be spaced from the beam 30 when the first energy absorbing device 26 is in the extended position. As another example, with reference to the embodiment shown in FIG. 4, the second energy absorbing device 28 may be spaced from the body panel 34 when the first energy absorbing device 26 is in the extended position.

The second energy absorbing device 28 may abut the bumper 24 when the first energy absorbing device 26 is in the compressed position. For example, with reference to the embodiment shown in Figure FIGS. 1-3 and 8-10, the second energy absorbing device 28 may abut the beam 30 when the first energy absorbing device 26 is in the compressed position. As another example, with reference to the embodiment shown in FIG. 4, the second energy absorbing device 28 may abut the body panel 34 when the first energy absorbing device 26 is in the compressed position (not shown).

With continued reference to FIGS. 1-10, the second energy absorbing device 28 may have a higher crush resistance than the first energy absorbing device 26. For example, an amount of energy required to decrease the length of the first energy absorbing device 26 by a certain amount may be less than the amount of energy required to decrease the length of the second energy absorbing device 28 by the certain amount. As another example, the second energy absorbing device 28 may have a higher Young's modulus than the first energy absorbing device 26.

The combination of the beam 30, body panel 34, first energy absorbing device 26, and second energy absorbing device 28 enables the bumper assembly 20 to absorb energy across multiple stages. For example, a force F applied during a vehicle impact the body panel 34 may deform to close the gap 46 between the first energy absorbing device 26 and the beam 30, or the gap 46 between the first energy absorbing device 26 and the body panel 34, as shown in FIG. 8, absorbing a first amount of energy. Next, provided the force F is of sufficient size, the body panel 34 continues to deform and the first energy absorbing device 26 deforms from the extended position to the compressed position, as shown in FIG. 9, absorbing a second amount of energy. Deformation of the body panel 34 and the first energy absorbing device 26 may be elastic until the first energy absorbing device 26 is in the compressed position. To put it another way, if the force F is removed before the second energy absorbing device 28 is deformed, or is of insufficient size to deform the second energy absorbing device 28, the first energy absorbing device 26 and the body panel 34 may elastically return to their pre-vehicle impact positions. After the second absorbing member abuts the beam 30 and the bumper 24, and provided the force F is of sufficient size, the second energy absorbing device 28 deforms along with the body panel 34 and the first energy absorbing device 26, as shown in FIG. 10, to absorb a third amount of energy.

The multiple stages of energy absorption described above enable the bumper assembly 20 to be tuned to various types of impact, e.g., to initially provide a softer impact as the first amount of energy is absorbed, and then progressively get firmer as the second and third amounts of energy are absorbed.

The bumper assembly 20 may include a third energy absorbing device 32 extending from the bumper 24, e.g., from the beam 30 or the body panel 34 as described for the first energy absorbing device 26. The third energy absorbing device 32 has a third axis A5 perpendicular to the first axis A1. The third axis A5 may be parallel to the second axis A3. The third energy absorbing device 32 may be elastically deformable along the third axis A5, e.g., between an extended and compressed position. The third energy absorbing device 32 may be as described above for the first energy absorbing device 26, e.g., may be cylindrical, may include rings 40 and connecting members 42, may define a cavity 44, may extend from the beam 30 or the bumper 24, may define a gap 46 between a distal end 38 and the beam 30 or the bumper 24, etc.

The bumper assembly 20 may include a fourth energy absorbing device 48. The fourth energy absorbing device 48 may be as described for the second energy absorbing device 28, except in relation to the third energy absorbing device 32. For example, the fourth energy absorbing device 48 may be within the third energy absorbing device 32, may be shorter than the third energy absorbing device 32, may be at the distal end 38 of the third energy absorbing device 32, may be co-axial with the third energy absorbing device 32, etc.

The third energy absorbing device 32 enables the bumper assembly 20 to be tuned, e.g., to have varying energy absorbing and deformation characteristics at different locations along the bumper assembly 20. To enable such tuning, the first energy absorbing device 26 may be spaced from the third energy absorbing device 32 along the first axis A1, e.g., along the cross-vehicle axis A2. To put is another way, the first energy absorbing device 26 may be at first location on the bumper assembly 20, and the third energy absorbing device 32 may be at a second location on the bumper assembly 20 spaced along the first axis A1 from the first location. The first energy absorbing device 26 may have a higher crush resistance than the third energy absorbing device 32. For example, the Young's modulus of the first energy absorbing device 26 may be greater than a Young's modulus of the third energy absorbing device 32, the first energy absorbing device 26 may be a stiffer material, may have thicker rings 40, etc., than the third energy absorbing device 32. The first energy absorbing device 26 may have an outer diameter D1 that is greater than an outer diameter D2 of the third energy absorbing device 32. Such outer diameters D1, D2 may be of the rings 40 of the first energy absorbing device 26 and the third energy absorbing device 32. The diameters D1, D2 of varying size enable the respective absorbing device 26, 32 to absorb energy from areas of the bumper assembly 20 of varying size, enable the respective energy absorbing devices 26, 32 to be packaged in the bumper assembly 20 at various locations with various size constraints, etc. The third energy absorbing device 32 and the fourth energy absorbing device 48 enables the bumper assembly 20 to absorb energy across multiple stages, as described for the first energy absorbing device 26 and the second energy absorbing device 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly, comprising:
    a bumper elongated along a first axis;
    a first energy absorbing device extending from the bumper, the first energy absorbing device having a second axis perpendicular to the first axis, the first energy absorbing device having a distal end spaced from the bumper, the first energy absorbing device being elastically deformable along the second axis; and
    a second energy absorbing device extending along and surrounding the second axis, the second energy absorbing device fixed to the distal end of the first energy absorbing device and extending from the distal end of the first energy absorbing device toward the bumper to a terminal end of the second energy absorbing device, the terminal end of the second energy absorbing device being within the first energy absorbing device, the second energy absorbing device being shorter than the first energy absorbing device.

2. The bumper assembly of claim 1, wherein the first energy absorbing device and the second energy absorbing device are coaxial on the second axis.

3. The bumper assembly of claim 1, wherein the first energy absorbing device defines a cavity and the second energy absorbing device is in the cavity.

4. The bumper assembly of claim 1, wherein the first energy absorbing device is cylindrical.

5. The bumper assembly of claim 1, wherein the first energy absorbing device includes a plurality of rings spaced from each other along the second axis and a plurality of connecting members extending between the rings.

6. The bumper assembly of claim 1, wherein the first energy absorbing device is elastically deformable from an extended position where the second energy absorbing device is spaced from the bumper to a compressed position where the second energy absorbing device abuts the bumper.

7. The bumper assembly of claim 1, wherein the second energy absorbing device has a higher crush resistance than the first energy absorbing device.

8. The bumper assembly of claim 1, wherein the bumper includes a beam.

9. The bumper assembly of claim 1, wherein the bumper includes a body panel.

10. A vehicle, comprising:
a bumper elongated along a cross-vehicle axis;
a first energy absorbing device extending from the bumper along a vehicle-longitudinal axis, the first energy absorbing device having a distal end spaced from the bumper, the first energy absorbing device being elastically deformable along the vehicle-longitudinal axis; and
a second energy absorbing device extending along and surrounding the vehicle-longitudinal axis, the second energy absorbing device fixed to the distal end of the first energy absorbing device and extending from the distal end of the first energy absorbing device toward the bumper to a terminal end of the second energy absorbing device, the terminal end of the second energy absorbing device being within the first energy absorbing device, the second energy absorbing device being shorter than the first energy absorbing device.

11. The vehicle of claim 10, wherein the first energy absorbing device extends vehicle-forward from the bumper.

12. The vehicle of claim 10, wherein the first energy absorbing device extends vehicle-rearward from the bumper.

13. The vehicle of claim 10, wherein the bumper includes a beam and a body panel, and the first energy absorbing device is between the beam and the body panel.

14. The vehicle of claim 13, wherein the first energy absorbing device extends from the beam and is spaced from the body panel.

15. The vehicle of claim 13, wherein the first energy absorbing device extends from the body panel and is spaced from the beam.

16. A bumper assembly, comprising:
a bumper elongated along a first axis;
a first energy absorbing device extending from the bumper, the first energy absorbing device having a second axis perpendicular to the first axis, the first energy absorbing device being elastically deformable along the second axis;
a second energy absorbing device within the first energy absorbing device and being shorter than the first energy absorbing device;
a third energy absorbing device extending from the bumper, the third energy absorbing device having a third axis perpendicular to the first axis, the third energy absorbing device being elastically deformable along the third axis; and
a fourth energy absorbing device within the third energy absorbing device and being shorter than the third energy absorbing device.

17. The bumper assembly of claim 16, wherein the first energy absorbing device has an outer diameter that is greater than an outer diameter of the third energy absorbing device.

18. The bumper assembly of claim 16, wherein the first energy absorbing device has a higher crush resistance than the third energy absorbing device.

19. The bumper assembly of claim 16, wherein the first energy absorbing device is spaced from the third energy absorbing device along the first axis.

* * * * *